(12) United States Patent
Cernius et al.

(10) Patent No.: US 8,174,972 B2
(45) Date of Patent: May 8, 2012

(54) SOFTWARE ASSISTED MULTICAST FILTERING

(75) Inventors: Tomas A. Cernius, Beverly Shores, IN (US); Andrew Stephen Hintz, Avon, IN (US)

(73) Assignee: Thomson Licensing, Issy les Moulineaux (FR)

( * ) Notice: Subject to any disclaimer, the term of this patent is extended or adjusted under 35 U.S.C. 154(b) by 329 days.

(21) Appl. No.: 12/156,048

(22) Filed: May 29, 2008

(65) Prior Publication Data

US 2009/0296735 A1    Dec. 3, 2009

(51) Int. Cl.
*H04J 1/16* (2006.01)
(52) U.S. Cl. .................................. 370/230; 370/229
(58) Field of Classification Search .............. 370/229, 370/230
See application file for complete search history.

(56) References Cited

U.S. PATENT DOCUMENTS

| 5,760,821 | A * | 6/1998 | Ellis et al. ..................... 725/50 |
| 2003/0081607 | A1* | 5/2003 | Kavanagh ..................... 370/392 |
| 2004/0073915 | A1* | 4/2004 | Dureau .......................... 725/9 |

* cited by examiner

*Primary Examiner* — Hassan Kizou
*Assistant Examiner* — Ashil Farahmand
(74) *Attorney, Agent, or Firm* — Robert D. Shedd; Jeffrey M. Navon; Catherine A. Cooper

(57) ABSTRACT

A method is described including determining if a packet length parameter included in received data matches a first pre-determined value, determining if an address parameter included in received data matches an address of a receiving device, determining if a length parameter included in received data matches a second pre-determined value, determining if a packet destination port number parameter included in received data matches a third pre-determined value, determining if a packet payload type parameter included in received data matches a fourth pre-determined value and dropping the packet responsive to the matches.

6 Claims, 2 Drawing Sheets

SOFTWARE ASSISTED MULTICAST FILTERING

FIELD OF THE INVENTION

The present invention relates to multicasting content to a receiving device. More specifically, the present invention relates to filtering unwanted packets by the receiving device at the software interrupt handler.

BACKGROUND OF THE INVENTION

As used herein, "/" denotes alternative names for the same or similar components or structures. That is, a "/" can be taken as meaning "or" as used herein.

The filtering of unwanted packets is a normal part of most network devices and is performed in either hardware or software or a combination or both. The present invention is directed to an unconventional/non-standard Universal Serial Bus (USB)/Ethernet interface to the network. The Ethernet chip filtering mechanism was inadequate and the DirecTV RTP packets had unusual attributes.

Most network-connected devices today, employ some type of low-level packet filtering to reduce time spent by the CPU processing unwanted packets not destined for the device. The hardware filtering available on one of the devices in a MFH3 system, proved inadequate. Time spent filtering packets at the software level was bogging down channel changes, guide acquisition, gaming speeds, etc. Additionally, the software filtering designed to catch all unwanted packets was being done at the task/application layer/level, rather than at the (more conventional and much faster) interrupt/driver/data link level/layer. The software filtering was being done at the task level, due to the complications of packet reassembly imposed by the unconventional combination USB/Ethernet network interface.

SUMMARY OF THE INVENTION

The software assisted multicast filter of the present invention is performed at the interrupt handler/driver/data link layer/level. The method filters out most of the unwanted packets so that they can be dropped/dumped. Those packets that the method of the present invention does not filter out and that need more effort due to the USB partitioning of Ethernet packets are passed along to the application/task level/layer for final filtering with no changes.

A method is described including determining if a packet length parameter included in received data matches a first pre-determined value, determining if an address parameter included in received data matches an address of a receiving device, determining if a length parameter included in received data matches a second pre-determined value, determining if a packet destination port number parameter included in received data matches a third pre-determined value, determining if a packet payload type parameter included in received data matches a fourth pre-determined value and dropping the packet responsive to the matches.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1A:
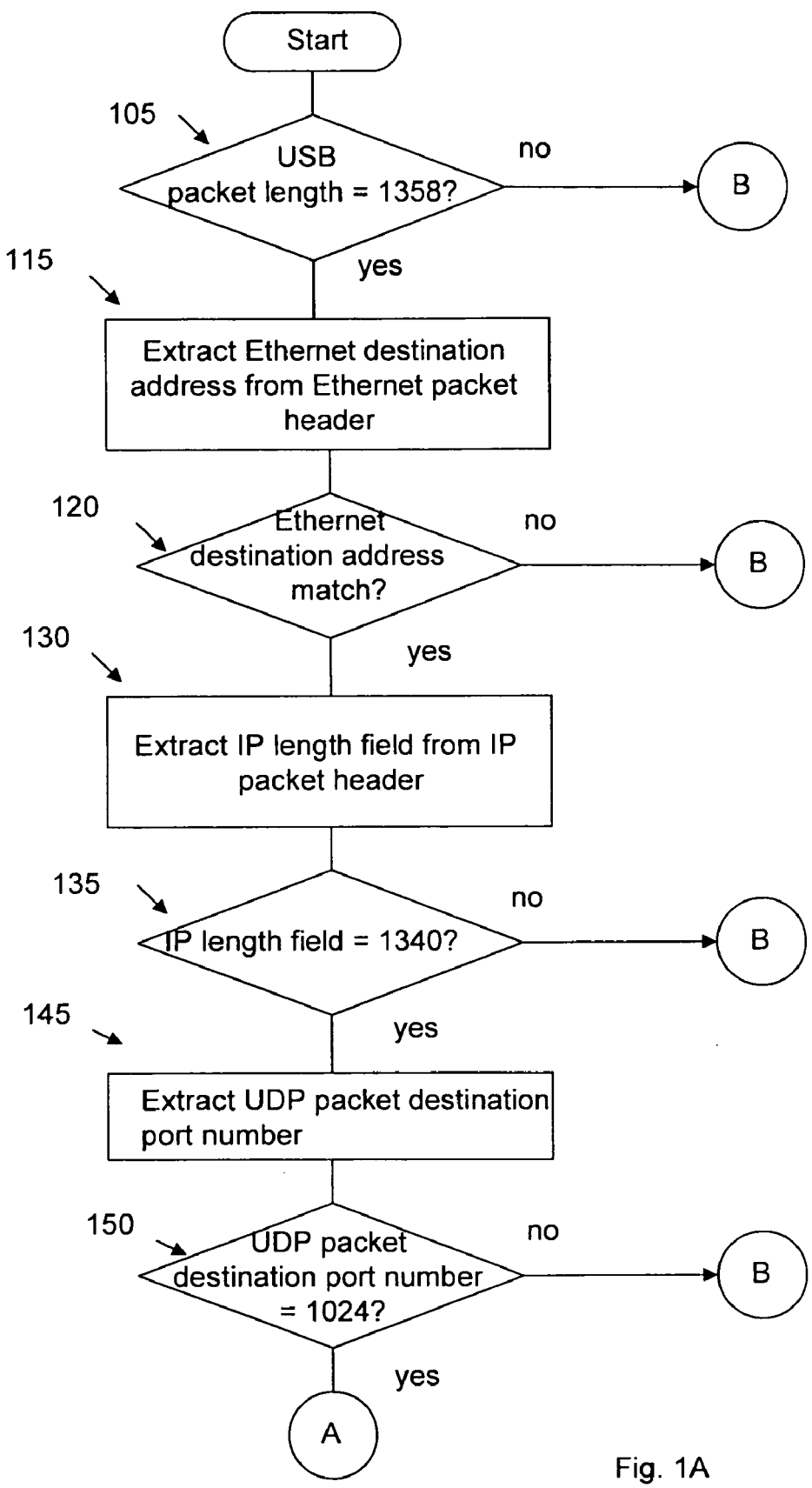
FIGS. 1A and 1B are together a flowchart of an exemplary embodiment of the software assisted filtering method of the present invention.

Most network-connected devices today, employ some type of low-level packet filtering to reduce time spent by the CPU processing unwanted packets not destined for the device. Unwanted packets are packets that are present on the network, but are not intended for this device. Typically, hardware filtering mechanisms work well and the CPU is never interrupted. Filtering mechanisms range from no filtering at all, to single destination address matching (only one unique address is allowed in, all others are dropped), or multiple destination address matching (several unique addresses are allowed in, all others are dropped).

Most hardware filtering mechanisms also include a multicast filtering option. Multicast addressing is used to send a single packet to a group, rather than a uniquely addressed packet to each member of the group. Multi-family housing version 3 (MFH3) enables distribution of satellite programming and services to multiple dwelling unit (MDU) and commercial sites using existing in-building wiring. In MFH3 systems, where users often watch the same programs, audio-video/multimedia packets stream across the network, destined for a specific group (i.e. people watching Channel 7 News). Those users have their multicast filter set to allow only this group to pass through the filter. One multicast stream, therefore, may serve many users (all the users in a group).

The hardware multicast filter available on one of the devices in a MFH3 system, separates all possible multicast addresses (thousands) into 64 buckets/bins, and then turns these buckets on/off for filtering. Because there are more than 64 multicast addresses (more than 64 channels), each bucket turns on and/or off filtering for many multicast addresses at a time. All buckets are normally off. When a particular group is joined, that group's bucket is turned on, allowing that group's packets to pass through the filter.

MFH3 devices also advertise the multicast groups of which they are members via IGMP (Internet Group Management Protocol). Network switches in the path between the client and the server (streamer and watcher) learn (via IGMP snooping), and do not forward multicast packets on their downstream links if those devices are not members of that particular multicast group. The switch knows no one on the downstream link wants that particular group's packets, so there is no reason to forward them.

The use of IGMP snooping and the 64 bit Ethernet hardware filter eliminates most cases of unwanted packet processing by the client CPU, but not all. Occasionally, a user with two or more installed set top boxes (STBs) will receive unwanted multicast packets on one unit that have gotten by both the upstream IGMP switch filter and the STB's 64 bit hardware filter. These multicast packets are not blocked by the network switch(es) because they are truly destined for STB2 (which sits next to STB1). These packets also get past the Ethernet hardware filter on STB1 because the STB2 multicast address falls within the same bucket as the current STB1 multicast address being watched. STB1 is now not only receiving its own currently watched multicast stream but also STB2's unwanted and unwatched multicast stream. When STB2 is a Hi-Definition (Hi-Def) capable unit (which requires more CPU power), and STB1 is a Standard-Definition (Std-Def) unit (lower CPU power) the additional load overwhelms STB1, bogging down channel changes, guide acquisition, gaming speeds, etc., because the final software filtering was being done at the task/application layer/level, rather than at the (more conventional and much faster) interrupt/driver/data link level/layer.

Software filtering was being done at the task/application layer/level due to the unconventional two-part Ethernet/USB adapter which includes an Ethernet/USB dongle, which has a USB interface on one end and a Ethernet interface on the other. The dongle allows the use of the USB port on the STB to connect to an Ethernet network. While the network is Ethernet, the USB is used to carry the packets to the network interface. A received Ethernet packet of 1500 bytes may be spread across several smaller USB packets (and therefore may need to be reassembled) or an Ethernet packet may share space with another Ethernet packet within a single USB packet (and therefore need to be extracted).

The present invention is therefore directed to a software assisted multicast filter which catches most unwanted packets. The present invention was added to the interrupt handler (part of the driver). The software assisted multicast filter of the present invention filtered out most of the unwanted packets during multicast overlap (the case were an unwanted multicast passes through the hardware filter because it shares a bucket with the current watched multicast). Those packets that need more work (due to USB partitioning) are passed on to the task/application layer/level filtering for reassembly.

Figure 1B:
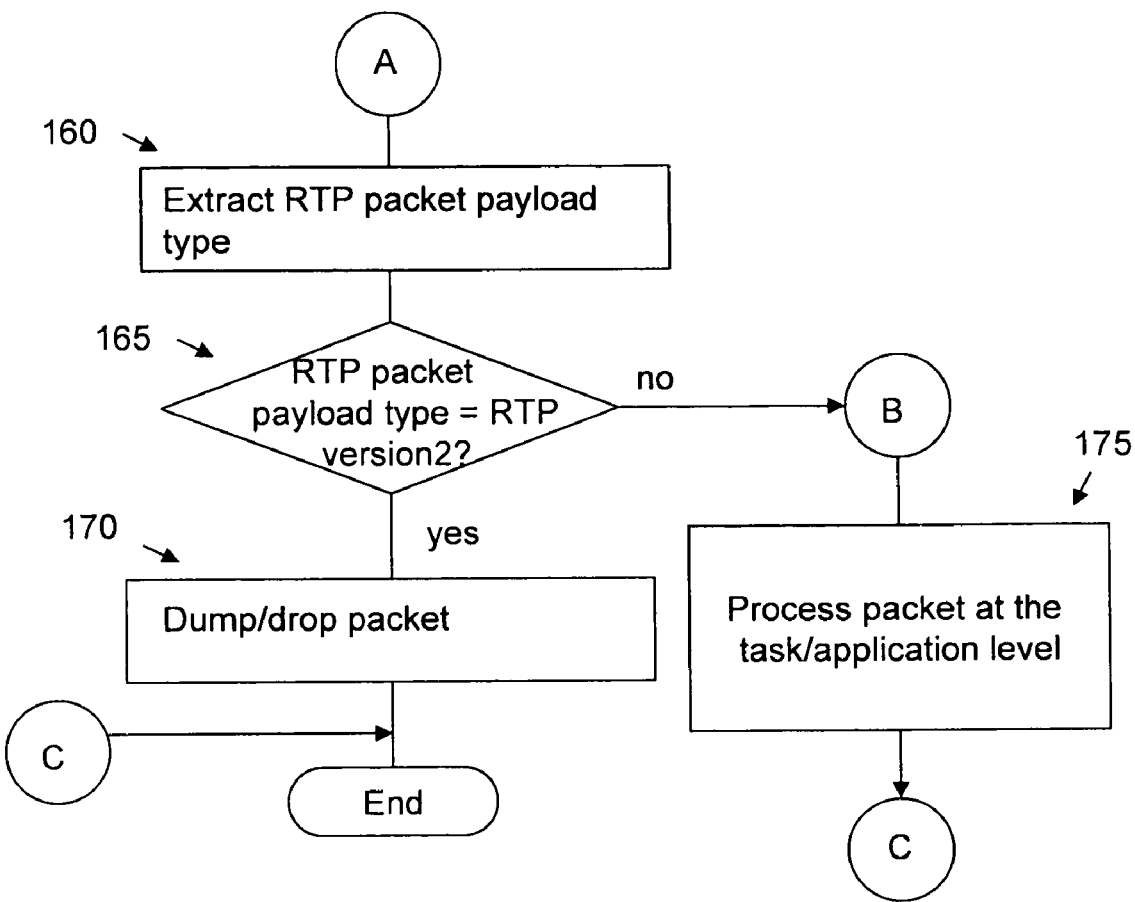

Referring now to FIGS. 1A and 1B, which are together a flowchart of the software assisted multicast filtering method of the present invention. The packet structure is a Real-time transport protocol (RTP) packet encapsulated in a User Datagram Protocol (UDP) packet encapsulated in an Internet Protocol (IP) packet encapsulated in an Ethernet packet encapsulated in a USB packet. The exact length of a single complete DirecTV, Direct TV being a trademarked name for service providers set top boxes RTP packet carrying audio-video/ multimedia data with all of the encapsulation including headers is 1358 bytes. The packet length is extracted from the packet structure. At 105 the incoming USB packet is tested and if its packet length is not 1358 then the packet is not an unwanted packet so end the processing of this packet using the software assisted multicast filter of the present invention. If the incoming USB packet length is 1358 then at 115 the Ethernet destination address is extracted from the Ethernet header. The Ethernet destination address is tested at 120. If the Ethernet destination address matches any of the currently used/accepted multicast group addresses then the packet is not an unwanted packet so end the processing of this packet using the software assisted multicast filter of the present invention. If the Ethernet destination address does not match any of the currently used/accepted multicast group addresses then the packet is potentially an unwanted packet. At 130 the IP length field is extracted from the IP header. At 135 the IP length field is tested to determine if the IP length field equals 1340. If the IP length field does not equal 1340 then the packet is not an unwanted packet so end the processing of this packet using the software assisted multicast filter of the present invention. If the IP length field equals 1340 then the packet is potentially an unwanted packet. At 145 the UDP packet destination address is extracted from the UDP packet header. At 150 the UDP packet destination port address is tested. If the UDP destination port address equals 1024 then the packet is not an unwanted packet so end the processing of this packet using the software assisted multicast filter of the present invention. If the UDP packet destination port address is 1024 then the packet is potentially an unwanted packet. At 160 the RTP packet payload type is extracted from the RTP packet header. At 165 the RTP packet payload type is tested. If the RTP packet payload type does not equal RTP version 2 for DirecTV then the packet cannot be filtered at the interrupt level using the present invention. If the RTP packet payload type equals RTP version 2 for DirecTV then the packet is an unwanted packet and at 170 the packet is dumped/dropped. At 175 if the packet is not dropped at the interrupt level, that does not mean that it will not be dropped at the task/application level. The packets which are not dropped will go to the task/ application level where they will be further reviewed and either rendered/displayed or dropped as unwanted packets. However, the goal of filtering out most of the unwanted packets will have been accomplished.

The method of the present invention is performed at the interrupt handler/driver/data link layer/level. The resulting measured increase in filtering performance was tenfold.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A packet filtering method for reducing the load on a processor of a set top box, said set top box including a hardware filter and a software assisted filter in a driver, said method comprising:

receiving data at said set top box, said received data being a real time protocol (RTP) packet encapsulated in a user datagram protocol (UDP) packet encapsulated in an internet protocol (IP) packet encapsulated in an Ethernet packet encapsulated in a universal serial bus (USB) packet;

using said hardware filter to determine if said received data is destined for a multicast group that is allowed by said hardware filter;

if said received data is allowed by the hardware filter, then using said software assisted filter to:

determine if a packet length parameter included in said received data matches a first pre-determined value;

determine if an address parameter included in said received data matches an address of a receiving device;

determine if a length parameter included in said received data matches a second pre-determined value;

determine if a packet destination port number parameter included in said received data matches a third pre-determined value;

determine if a packet payload type parameter included in said received data matches a fourth pre-determined value; and dropping said received data if there is a match for all determinations.

2. The method according to claim 1, wherein said first pre-determined value is 1358.

3. The method according to claim 1 wherein said second pre-determined value is 1340.

4. The method according to claim 1, wherein said third pre-determined value is 1024.

5. The method according to claim 1, wherein said fourth pre-determined value is "RTP Version 2".

6. The method, according to claim 1, wherein no action is taken if any of said matches are negative.

* * * * *